US012545112B2

(12) United States Patent
Nagakari (10) Patent No.: US 12,545,112 B2
(45) Date of Patent: Feb. 10, 2026

(54) MANAGING CONTENT DISPLAYED IN A VEHICLE

(71) Applicant: TOYOTA JIDOSHA KABUSHIKI KAISHA, Aichi-ken (JP)

(72) Inventor: Takahiro Nagakari, Koganei (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 47 days.

(21) Appl. No.: 18/652,766

(22) Filed: May 1, 2024

(65) Prior Publication Data
US 2025/0340119 A1 Nov. 6, 2025

(51) Int. Cl.
*B60K 35/65* (2024.01)
*B60W 50/14* (2020.01)
*G06V 20/59* (2022.01)
*G06V 40/16* (2022.01)

(52) U.S. Cl.
CPC ............ *B60K 35/65* (2024.01); *B60W 50/14* (2013.01); *G06V 20/59* (2022.01); *G06V 40/172* (2022.01); *B60K 2360/731* (2024.01); *B60W 2050/146* (2013.01); *B60W 2420/403* (2013.01); *B60W 2540/043* (2020.02); *B60W 2556/45* (2020.02)

(58) Field of Classification Search
CPC .. B60K 35/65; B60K 2360/731; G06V 20/59; G06V 40/172; B60W 50/14; B60W 2540/043; B60W 2556/45; B60W 2050/146; B60W 2420/403; G07C 5/008; G08G 1/00; B60Q 9/00
USPC .......................................................... 701/36
See application file for complete search history.

(56) References Cited

U.S. PATENT DOCUMENTS

| | | |
|---|---|---|
| 11,240,563 B1 | 2/2022 | Samarthyam et al. |
| 11,611,451 B1 * | 3/2023 | Meingast ............... H04L 67/535 |
| 2003/0202683 A1 * | 10/2003 | Ma .................... G08G 1/096725 |
| | | 382/104 |
| 2009/0279839 A1 | 11/2009 | Nakamura et al. |
| 2012/0020641 A1 | 1/2012 | Sakaniwa et al. |
| 2019/0375312 A1 * | 12/2019 | Petersson .......... B60R 21/01554 |
| 2022/0319127 A1 * | 10/2022 | Tkachenko ............ G06V 40/20 |
| 2025/0242798 A1 * | 7/2025 | Dasher .................. B60W 30/06 |

FOREIGN PATENT DOCUMENTS

| | | | | |
|---|---|---|---|---|
| EP | 4202610 A1 * | 6/2023 | ............. | G06F 3/015 |
| JP | 2007-306527 A | 11/2007 | | |
| JP | 2009-296309 A | 12/2009 | | |
| JP | 2020-082955 A | 6/2020 | | |
| JP | 2023-111615 A | 8/2023 | | |
| JP | 2023-549679 A | 11/2023 | | |
| WO | WO-2022245770 A1 * | 11/2022 | ............. | G06V 20/59 |

\* cited by examiner

*Primary Examiner* — Tuan C To
(74) *Attorney, Agent, or Firm* — HAUPTMAN HAM, LLP (57) ABSTRACT

A method for managing content displayed in a vehicle. At least one occupant in a vehicle consuming content is determined. Identification information identifying the at least one occupant is acquired. The at least one occupant exiting the vehicle is detected. Identification information identifying the at least one occupant, a content identifier (ID) of the content consumed by the at least one occupant, and a last position of the content at a time the at least one occupant exits the vehicle are saved. The at least one occupant re-entering the vehicle is detected. The content identified by the content ID is resumed at the last position of the content for the at least one occupant associated with the identification identifier.

20 Claims, 5 Drawing Sheets

MANAGING CONTENT DISPLAYED IN A VEHICLE

TECHNICAL FIELD

This description relates to managing content displayed in a vehicle.

BACKGROUND

The presentation of audio and/or video content within a vehicle has become common in many traveling experiences. For example, vehicle drivers often listen to audio content (e.g., music and/or audible text) while driving, and riders often watch videos within the vehicle while waiting to reach their destination. Additional content includes web browsing, streaming content, and the like. Using a mobile device or other media-playback device, such as an In-Vehicle Infotainment (IVI) System (also referred to as simply Infotainment System), a person is able to access content.

However, a user often exits the vehicle for various reasons, e.g., refueling, dining, shopping, and the like. Content continues to be presented even though the user exiting the vehicle. In response to a user in a vehicle exiting the vehicle in the middle of watching content, there is no way to resume watching the content from the point in time in the content of the user exiting the vehicle and returning to the vehicle.

SUMMARY

In at least embodiment, a method for managing content displayed in a vehicle includes determining at least one occupant in a vehicle consuming content, acquiring identification information identifying the at least one occupant, detecting the at least one occupant exiting the vehicle, saving identification information identifying the at least one occupant, a content identifier (ID) of the content consumed by the at least one occupant, and a last position of the content at a time the at least one occupant exits the vehicle, detecting the at least one occupant re-entering the vehicle, retrieving the identification information identifying the at least one occupant, the content ID for the content, and the last position of the content associated with the identification information identifying the at least one occupant, and resuming the content identified by the content ID at the last position of the content for the at least one occupant associated with the identification identifier.

In at least one embodiment, an apparatus for managing content displayed in a vehicle includes a memory storing computer-readable instructions, and a processor connected to the memory, wherein the processor is configured to execute the computer-readable instructions to perform operations to determine at least one occupant in a vehicle consuming content, acquire identification information identifying the at least one occupant, detect the at least one occupant exiting the vehicle, save identification information identifying the at least one occupant, a content identifier (ID) of the content consumed by the at least one occupant, and a last position of the content at a time the at least one occupant exits the vehicle, detect the at least one occupant re-entering the vehicle, retrieve the identification information identifying the at least one occupant, the content ID for the content, and the last position of the content associated with the identification information identifying the at least one occupant, and resume the content identified by the content ID at the last position of the content for the at least one occupant associated with the identification identifier.

In at least one embodiment, a non-transitory computer-readable media having computer-readable instructions stored thereon, which when executed by a processor causes the processor to perform operations including determining at least one occupant in a vehicle consuming content, acquiring identification information identifying the at least one occupant, detecting the at least one occupant exiting the vehicle, saving identification information identifying the at least one occupant, a content identifier (ID) of the content consumed by the at least one occupant, and a last position of the content at a time the at least one occupant exits the vehicle, detecting the at least one occupant re-entering the vehicle, retrieving the identification information identifying the at least one occupant, the content ID for the content, and the last position of the content associated with the identification information identifying the at least one occupant, and resuming the content identified by the content ID at the last position of the content for the at least one occupant associated with the identification identifier.

BRIEF DESCRIPTION OF THE DRAWINGS

Features, aspects, and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched, as long as these modifications may not affect the resulting scope of the invention.

It will be apparent that systems and/or methods, described herein, are able to be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein is to be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

The foregoing disclosure provides illustration and description but is not intended to be exhaustive or to limit the implementations to the precise form disclosed. Modifications and variations are possible in light of the above disclosure or may be acquired from practice of the implementations.

In at least one embodiment, a method includes determining at least one occupant in a vehicle consuming content, acquiring identification information identifying the at least one occupant, detecting the at least one occupant exiting the vehicle, saving identification information identifying the at least one occupant, a content identifier (ID) of the content consumed by the occupant, and a last position of the content at a time the at least one occupant exits the vehicle, detecting the occupant re-entering the vehicle, retrieving the identification information identifying the at least one occupant, the content ID for the content, and the last position of the content associated with the identification information identifying the at least one occupant, and resuming the content identified by the content ID at the last position for the occupant associated with the identification identifier.

Embodiments described herein provide a method that provides one or more advantages. For example, a Cockpit Domain Controller is able to identify a time an occupant that is consuming content exits a vehicle and associate a point in the content (last condition) with the time the occupant exits the vehicle. Upon detecting that the occupant has re-entered the vehicle, the Cockpit Domain Controller is able to resume content from the point in the content (last condition) associated with the time the occupant exits the vehicle.

Figure 1:
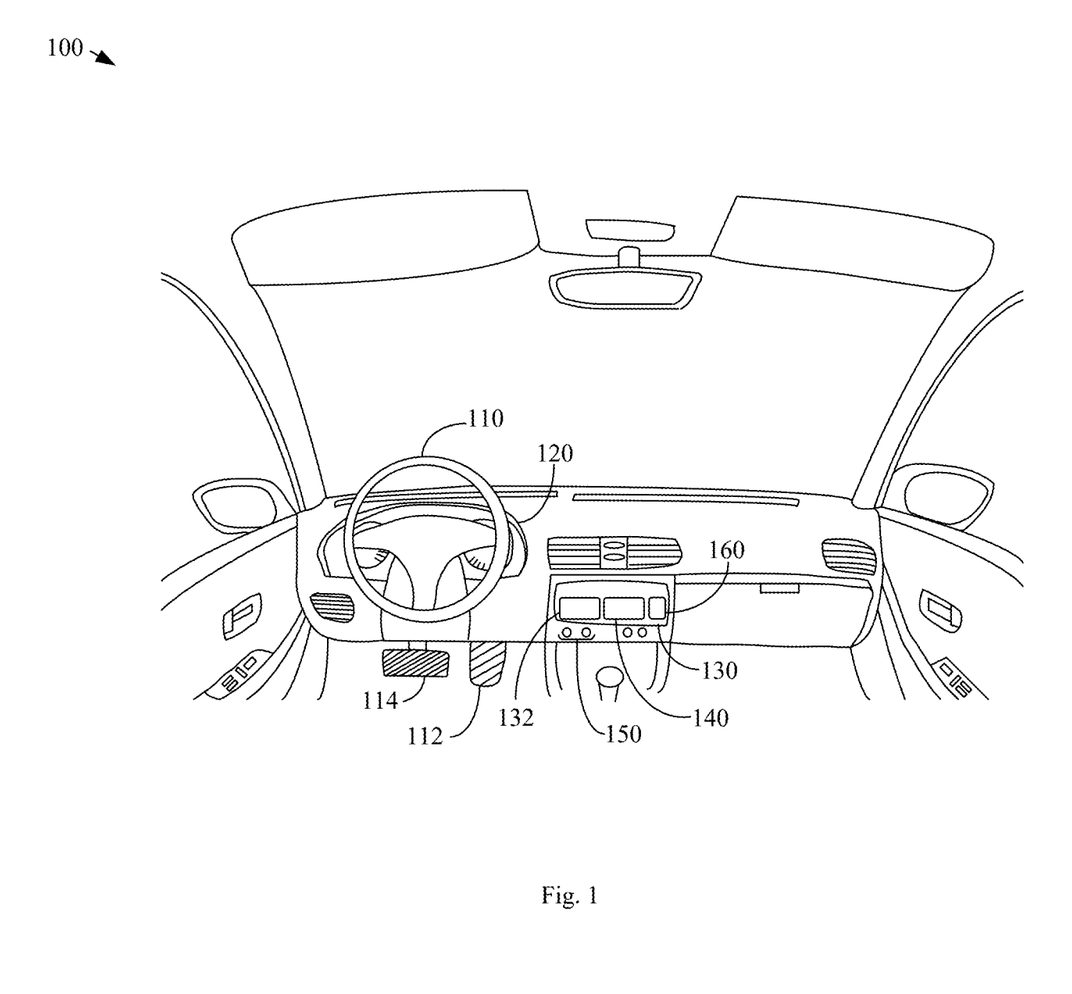
FIG. 1 illustrates a vehicle cockpit according to at least one embodiment.

FIG. 1 illustrates a vehicle cockpit 100 according to at least one embodiment.

In FIG. 1, the vehicle cockpit includes Steering Wheel 110, Accelerator Pedal 112, Brake Pedal 114, Instrument Panel 120, Infotainment System 130, and Climate Control System 140. Climate Control System 140 is also sometimes referred to as the Heating, Ventilation, and Air Conditioning (HVAC) System. The Steering Wheel is the part of the steering system that is manipulated by the driver to control the steering system and the direction of the vehicle. By manipulating the Steering Wheel 110, the driver directs the direction of the vehicle through a linkage system to the front wheels. The Accelerator Pedal 112 is used to control fuel and air supply to the engine by application of pressure. Accelerator Pedal 112 is also known as the throttle or gas pedal. The Brake Pedal 114 is pressed to apply the brakes, which cause the vehicle to slow down and/or stop.

Instrument Panel 120 is the portion of the dashboard which is positioned behind the Steering Wheel 110. The Instrument Panel 120 includes various gauges and lights that update the driver on the status of the vehicle. For example, Instrument Panel 120 often includes traction control indicators, engine temperature, tachometer, a fuel gauge, a speedometer, an odometer, turn indicators, gear display, various warning lights, and the like. The tachometer displays the rotation of the engine's crankshaft in revolutions per minute (RPM). The speedometer shows the speed of the vehicle. The odometer shows you the total number of miles traveled since you started driving the car. The fuel gauge shows you how much fuel is left in the vehicle. The temperature gauge indicates the current engine temperature.

Alternatively, a designated light is able to be included to warn about engine temperature issues, such as engine overheating. Turn indicators represent flashing lights on either side of the vehicle to communicate to other drivers the direction that the driver intends to turn. A gear display or gear position indicators shows the gear that is currently engaged, e.g., park, neutral, drive, and the like. Warning lights communicate different status items of the vehicle. Vehicles have various features like ESC and ABS pre-installed, not to mention the more standard components or elements. Warning lights are illuminated briefly upon startup as the vehicle checks to ensure the systems are safe and ready for operation. Occasionally one warning light might stay on, indicating a problem, e.g., the engine, headlights, temperature, and the like.

The vehicle includes an Infotainment System 130. In at least one embodiment, the Infotainment System 130 is an In-Vehicle Infotainment (IVI) System (also referred to as simply Infotainment System). However, embodiments described herein are not meant to be limited to IVI Systems. Infotainment System 130 includes one or more Displays 132 for presenting content to occupants of the vehicle. For example, the one or more Displays 132 are able to be positioned for presenting content to each seat in the vehicle.

A Cockpit Domain Controller 140 provides a collection of hardware and software in vehicles that provides content to an occupant of the vehicle, such as audio, video, and other content or information. Cockpit Domain Controller 140 controls the presentation of content and stores conditions for each occupant. A vehicle is also able to include Camera Systems 150. Camera Systems 150 are configured to provide face recognition of occupants, such as the driver and occupants of other passenger seats. Cockpit Domain Controller 140 is able to detect the presence of an occupant and to detect an occupant exiting the vehicle using Camera System 150 or other Sensors (e.g., communication sensors, occupancy sensors, vibration sensors, motion sensors, and the like).

A Data Communication Interface 160 communicates with devices outside the vehicle for providing content to users in the vehicle. Such devices include smart phones, tablets, televisions, laptop computers, servers, and the like. Data Communication Interface 160 supports communication using a wireless connection in accordance with any IEEE 802.11 Wi-Fi protocols, Bluetooth protocols, Bluetooth Low Energy (BLE), or other short range protocols that operate in accordance with a wireless technology standard for exchanging data using any licensed or unlicensed band such as the citizens broadband radio service (CBRS) band, mobile cellular systems using 2.4 GHz bands, 5 GHz bands, 6 GHz bands, and the like. Additionally, a wireless connection is able to operate in accordance with, but is not limited to, RF4CE protocol, ZigBee protocol, Z-Wave protocol, or IEEE 802.15.4 protocol. Those skilled in the art understand that Data Communication Interface 160 is not meant to be limited to a particular communication system or protocol.

Figure 2:
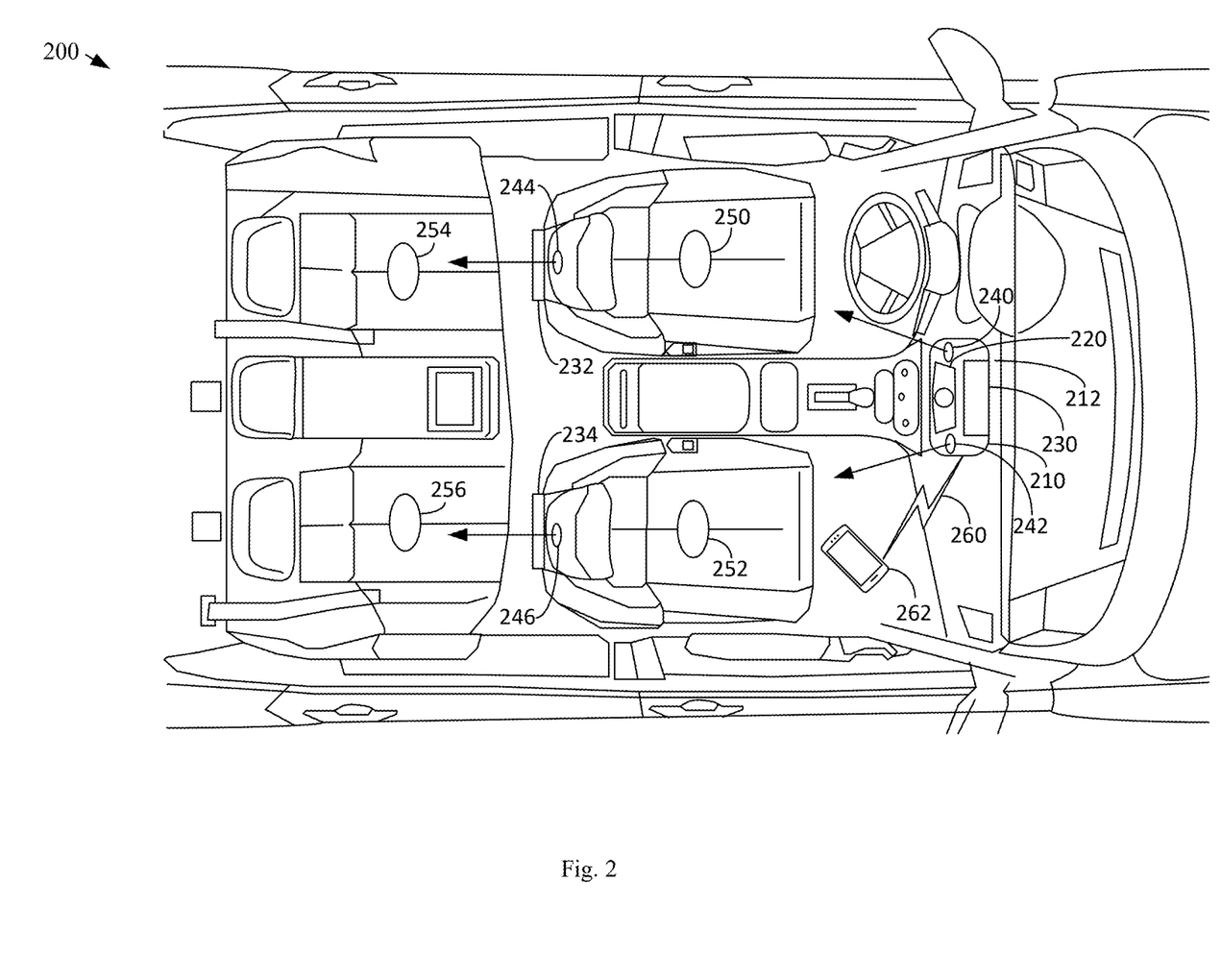
FIG. 2 is a interior diagram of a vehicle according to at least one embodiment.

FIG. 2 is a interior diagram of a vehicle 200 according to at least one embodiment.

In FIG. 2, an Infotainment System 210 is shown centrally located in the dashboard 212 of the vehicle. The Infotainment System 210 is able to be an In-Vehicle Infotainment (IVI) System (also referred to as simply Infotainment System). Infotainment System 210 includes a Cockpit Domain Controller 220 for outputting contents, storing the last condition associated with content consumed by occupants, and managing data for recovering the last condition associated with the content.

Infotainment System 210 also includes a central Display 230 for presenting content and information regarding the presentation of content. Additional Displays 232, 234 are able to be provided separately for each backseat passenger. Those skilled in the art understand that other arrangements and number of Displays 230, 232, 234 are able to be provided.

In the embodiment shown in FIG. 2, four cameras 240, 242, 244, 246 are provided to implement a Camera System. A first camera 240 is directed at the driver. A second camera 242 is directed toward the front seat passenger. A third camera 244 and a fourth camera 246 are directed toward each of two backseat passengers. However, those skilled in the art understand that the number of cameras implemented by Camera System may be greater or less than four. For example, a single front camera 240 is able to be implemented to monitor the front seat driver and passenger. Other arrangements are contemplated by embodiments described herein.

Other Sensors include Occupancy Sensors 250, 252, 254, 256. Occupancy Sensors 250, 252, 254, 256 are able to provide Cockpit Domain Controller 220 with information indicating the presence or absence of an occupant associated therewith. Those skilled in the art understand that other types of sensors are capable of being used to determine the presence or absence of an occupant, such as an occupant exiting the vehicle.

The occupant exiting the vehicle is able to be determined by the Cockpit Domain Controller 220 based on input from the Camera System 240, 242, 244, 246. The occupant exiting the vehicle is able to be determined by the Cockpit Domain Controller 220 based on input from Occupancy Sensors 250, 252, 254, 256. The occupant exiting the vehicle is able to be determined by the Cockpit Domain Controller 220 based on a loss of a Connection 260 by a Device 262 of an occupant, such as a Bluetooth, Wi-Fi connection, and the like. Other connections are also able to be used by Cockpit Domain Controller 220 to determine that an occupant has exited the vehicle.

Upon detecting an occupant exiting the vehicle, the Cockpit Domain Controller 220 determines a last condition of the content being presented to the existing occupant. A position condition of content being consumed by an occupant, e.g., a video, music, and the like, is associated with the time the occupant exits the vehicle. The last condition is able to be determined by the Cockpit Domain Controller 220.

At a later time, the Cockpit Domain Controller 220 detects the occupant returning to the vehicle based on at least one of the Camera System 240, 242, 244, 246, the Occupancy Sensors 250, 252, 254, 256, reestablishment of Connection 260 by Device 262, and the like. The Cockpit Domain Controller 220 then presents the content using the last condition for content based on the time the occupant exited the vehicle.

Figure 3:
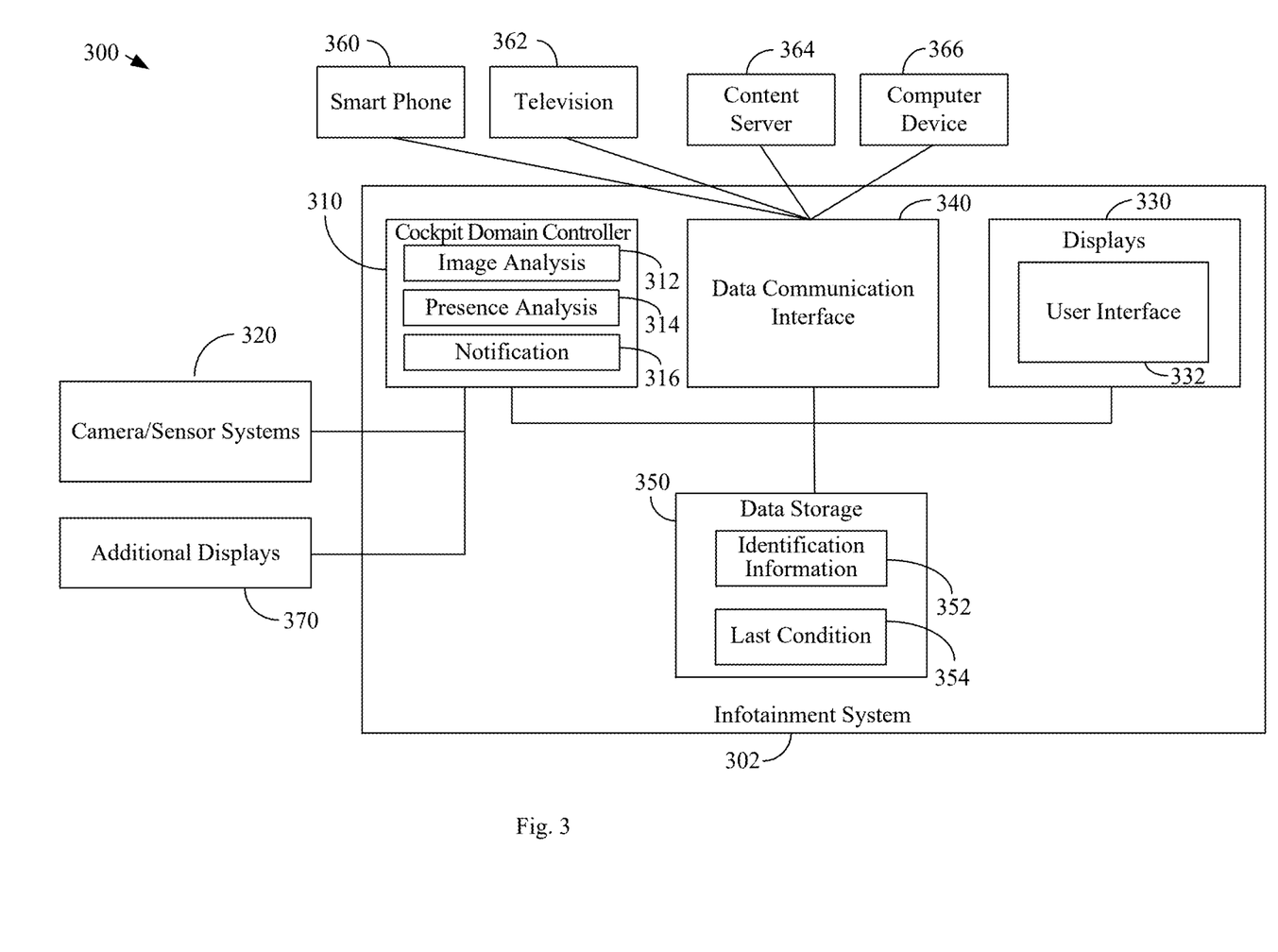
FIG. 3 is a system architecture according to at least one embodiment.

FIG. 3 is a system architecture 300 according to at least one embodiment.

In FIG. 3, Infotainment System 302 includes a Cockpit Domain Controller 310 for outputting contents, storing the last condition associated with content consumed by occupants, and managing data for recovering the last condition associated with the content. An entertainment portal is able to be specific to a single occupant, or is able to be associated with more than one occupant. One or more Displays 330 are used to present content and to present identification of each occupant using a User Interface 332. As explained above, Additional Displays 370 are able to be provided, for example, for each backseat passenger. Content includes content that is able to be displayed on a screen, such as YouTube, web browsing activity, video games, movies, music data, and the like.

Cockpit Domain Controller 310 identifies the last condition of the content being presented at the time the occupant exits the vehicle. A Data Communication Interface 340 is coupled to the Cockpit Domain Controller 310 to communicate with devices inside or outside the vehicle. For example, the Data Communication Interface 340 is able to communicate with a Smart Phone 360, a Television 362, a Content Server 364, a Computer Device 366 (e.g., a personal computer, a tablet, a laptop, and the like). Data Communication Interface 340 is able to use a wireless network. The Cockpit Domain Controller 310 is also able to communicate with user devices using a wireless network. Examples of wireless networks include Wi-Fi, an Internet Hot Spot, Bluetooth, Zigbee, Z-Wave, Infrared (IR) wireless, Ultra-Wideband (UWB), Wireless Gigabit (or WiGig), and the like. Data Communication Interface 340 supports communication using a wireless connection in accordance with any IEEE 802.11 Wi-Fi protocols, Bluetooth protocols, Bluetooth Low Energy (BLE), or other short range protocols that operate in accordance with a wireless technology standard for exchanging data using any licensed or unlicensed band such as the citizens broadband radio service (CBRS) band, mobile cellular systems using 2.4 GHz bands, 5 GHz bands, 6 GHz bands, and the like. Additionally, Data Communication Interface 340 supports wireless connections in accordance with, but not limited to, RF4CE protocol, ZigBee protocol, Z-Wave protocol, or IEEE 802.15.4 protocol. Those skilled in the art understand that Data Communication Interface 160 is not meant to be limited to a particular communication system or protocol.

Identification Information 352 is acquired by the Cockpit Domain Controller 310 to identify at least one occupant who is watching some content. Content is associated with an occupant through the Identification Information 352. The Identification Information 352 is based on retrieval of information associated with a registered user. A user is able to establish an account through the registration so that data is associated with the occupant (identification of the occupant, content identification (ID), and a last condition).

Positions of the occupants are also able to be detected. The Identification Information 352 includes information identifying an occupant such as a facial image, device ID, and the like. For example, a Camera System 320, including one or more cameras, is able to be coupled to the Cockpit Domain Controller 310 to detect an occupant. The Cockpit Domain Controller 310 performs facial recognition to identify occupants in each area of the vehicle based on images from Camera System 320. Image analysis, e.g., machine learning, is able to be used to analyze images of occupants to determine Identification Information 352 for each occupant. Other Sensors 320 are also capable of being used. For Example, Cockpit Domain Controller 310 receives presence data from Other Sensors and performs Presence Analysis 314 for devices of the occupants to detect the presence of an occupant.

The occupant is detected exiting the vehicle. The occupant exiting the vehicle is able to be determined by the Cockpit Domain Controller 310 based on input from the Camera/Sensor Systems 320, loss of Bluetooth or Wi-Fi connection, and the like. Upon detecting an occupant exiting the vehicle, a Last Condition 354 of the content associated with the Identification Information 352 is determined.

The Last Condition 354 includes a position indicator of content being consumed by an occupant, e.g., a video, music, and the like, wherein the position indicator is associated with the time the occupant exits the vehicle. The Last Condition 354 is indicated by the position indicator, e.g., a timestamp, a scroll position, a state function, and the like, along with a content identifier (content ID) of the content itself. The content ID is able to be a name of a video, a link to the content, a web address, a name of a game, a product code. The Cockpit Domain Controller 310 stores information, including the content ID, Last Condition 354 as indicated, for example, by a position indicator. However, according to at least one embodiment, information is able to be stored in Data Storage 350, in the cloud, in a separate storage system, or any other storage configuration.

At a later time, the Cockpit Domain Controller 310 detects the occupant returning to the vehicle. The Cockpit Domain Controller 310 identifies the occupant re-entering the vehicle according to the Identification Information 352, and then obtains the content ID associated with the re-entering occupant, and the Last Condition 354 for the content. Using the Last Condition 354, the content is able to be played from the point the occupant exited the vehicle or slightly before the last condition. The Last Condition 354 includes a time stamp associated with the content when the occupant exited the vehicle, an approximate last position, a calculated estimate of the Last Condition 354, and the like. For example, in response to the timestamp indicating the Last Condition 354 being a position at 10 minutes, playback is able to start, for example, at 9 minutes and 50 seconds.

Information about the Last Condition 354 of the content is able to be sent to the occupant, e.g., the information is sent to a user device such as a smartphone, a personal computer or laptop, a TV, and the like. Information about the Last Condition 354 of the content is able to be presented on one or more Displays 330. The information about the Last Condition 354 is able to be sent to the occupant via a Notification 316 sent to the occupant via at least one of a text message, an email, a push notification to an application, a voice mail message, and the like. The occupant is able to retrieve the Last Condition 354 of the content via the User Interface 332 in the vehicle. Information about the content and the last condition, as an option, is also able to be presented on one or more Displays 330 in the vehicle, e.g., an infotainment system.

Upon an occupant re-entering the vehicle, the Cockpit Domain Controller 310 accesses Data Storage 350 to determine possible existing entries associated with the re-entering occupant. In some situations, the Cockpit Domain Controller 310 does not identify any entries associated with the occupant. In this situation, the Cockpit Domain Controller 310 is able to question the occupant for information via User Interface 332, such as a content ID and position. In another situation, the Cockpit Domain Controller 310 identifies more than one entry associated with the occupant. Again, the Cockpit Domain Controller 310 is able to communicate with the occupant through a device of the occupant or via the one or more Displays 330 to determine which entry the occupant wants to use.

The Cockpit Domain Controller 310 is also able to use a default setting that uses the latest entry. The Cockpit Domain Controller 310 is also able to delete older entries and save a current entry in response to an occupant exiting the vehicle so that multiple entries are not used. In response to the user re-entering the vehicle, the entry is read from Data Storage 350 and then removed. The occupant re-entering the vehicle is thus able to resume consuming the content from the last position.

Figure 4:
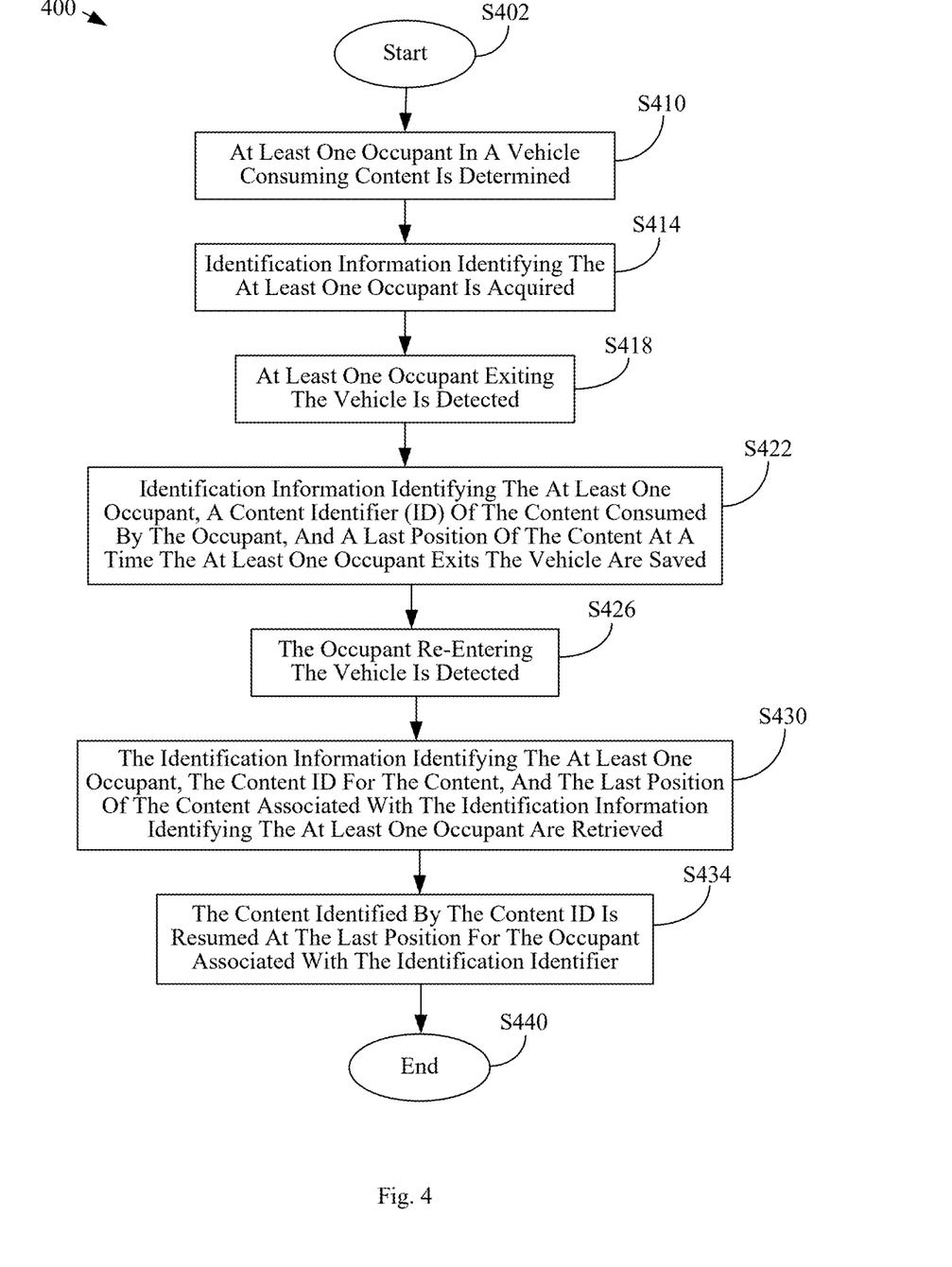
FIG. 4 is a flowchart of a method for managing content displayed in a vehicle according to at least one embodiment.

FIG. 4 is a is a flowchart 400 of a method for managing content displayed in a vehicle according to at least one embodiment.

In FIG. 4, the process starts S402 and at least one occupant in a vehicle consuming content is determined S410. Referring to FIG. 3, Cockpit Domain Controller 310 acquires Identification information 352 from Data Storage 350 to identify at least one occupant who is watching some content.

Identification information identifying the at least one occupant is acquired S414. Referring to FIG. 3, Content is associated with an occupant through the Identification Information 352. The Identification Information 352 is acquired by retrieving Identification Information 352 associated with a registered user. Identification Information 352 includes information identifying an occupant such as a facial image, device ID, and the like. For example, a Camera System 320, including one or more cameras, is able to be coupled to the Cockpit Domain Controller 310 to detect an occupant. The Cockpit Domain Controller 310 performs facial recognition to identify occupants in each area of the vehicle based on images from Camera System 320. Image Analysis 312, e.g., machine learning, is able to be used to analyze images of occupants to determine Identification Information 352 for each occupant. Other Sensors 320 are also capable of being used. For Example, Cockpit Domain Controller 310 receives presence data from Other Sensors and performs Presence Analysis 314 for devices of the occupants to detect the presence of an occupant. The Identification Information 352 also includes an identifier of a device of the at least one occupant. The Identification Information 352 is based on retrieval of information associated with a registered user. A user is able to establish an account through the registration so that data is associated with the occupant (identification of the occupant, content identification (ID), and a last condition).

At least one occupant exiting the vehicle is detected S418. Referring to FIG. 3, at least one occupant exiting the vehicle is able to be determined by the Cockpit Domain Controller 310 based on input from the Camera/Sensor Systems 320, loss of Bluetooth or Wi-Fi connection, and the like.

Identification information identifying the at least one occupant, a content identifier (ID) of the content consumed by the occupant, and a last position of the content at a time the at least one occupant exits the vehicle are saved S422. Referring to FIG. 3, the Cockpit Domain Controller 310 stores Identification Information 352 in Data Storage 350, including identity of the occupant, the content ID of the content consumed by the occupant, and a last condition as indicated, for example, by a position indicator. However, according to at least one embodiment, information is able to be stored in the cloud, in a separate storage system, or any other storage configuration. Upon detecting an occupant exiting the vehicle, a Last Condition 354 of the content associated with the Identification Information 352 is determined. Last Condition 354 includes a position indicator of content being consumed by an occupant, e.g., a video, music, and the like, wherein the position indicator is associated with the time the occupant exits the vehicle. The Last Condition 354 is indicated by the position indicator, e.g., a timestamp, a scroll position, a state function, and the like, along with a content identifier (content ID) of the content itself. The content ID is able to be a name of a video, a link to the content, a web address, a name of a game, a product code.

The occupant re-entering the vehicle is detected S426. Referring to FIG. 3, the Cockpit Domain Controller 310 detects the occupant returning to the vehicle. The Cockpit Domain Controller 310 identifies the occupant re-entering the vehicle according to the Identification Information 352

The identification information identifying the at least one occupant, the content ID for the content, and the last position of the content associated with the identification information identifying the at least one occupant are retrieved S430. Referring to FIG. 3, the Cockpit Domain Controller 310 identifies the occupant re-entering the vehicle according to the Identification Information 352, and then obtains the content ID associated with the re-entering occupant, and the Last Condition 354 for the content. Using the last condition, the content is able to be played from the point the occupant exited the vehicle or slightly before the Last Condition 354. The Last Condition 354 includes a time stamp associated with the content when the occupant exited the vehicle, an approximate last position, a calculated estimate of the last position, and the like. For example, in response to the timestamp indicating the Last Condition 354 being a position at 10 minutes, playback is able to start, for example, at 9 minutes and 50 seconds. Identification Information 352 includes information identifying an occupant such as a facial image, device ID, and the like. Information about the Last Condition 354 of the content is able to be presented on one or more Displays 330. The information about the Last Condition 354 is able to be sent to the occupant via a Notification 316 sent to the occupant via at least one of a text message, an email, a push notification to an application, a voice mail message, and the like.

The content identified by the content ID is resumed at the last position for the occupant associated with the identification identifier S434. Referring to FIG. 3, in response to the user re-entering the vehicle, the entry is read from Data Storage 350 and then removed. The occupant re-entering the vehicle is thus able to resume consuming the content from the last position.

The process then terminates S440.

At least one embodiment of the method includes determining at least one occupant in a vehicle consuming content, acquiring identification information identifying the at least one occupant, detecting the at least one occupant exiting the vehicle, saving identification information identifying the at least one occupant, a content identifier (ID) of the content consumed by the occupant, and a last position of the content at a time the at least one occupant exits the vehicle, detecting the occupant re-entering the vehicle, retrieving the identification information identifying the at least one occupant, the content ID for the content, and the last position of the content associated with the identification information identifying the at least one occupant, and resuming the content identified by the content ID at the last position for the occupant associated with the identification identifier.

Figure 5:
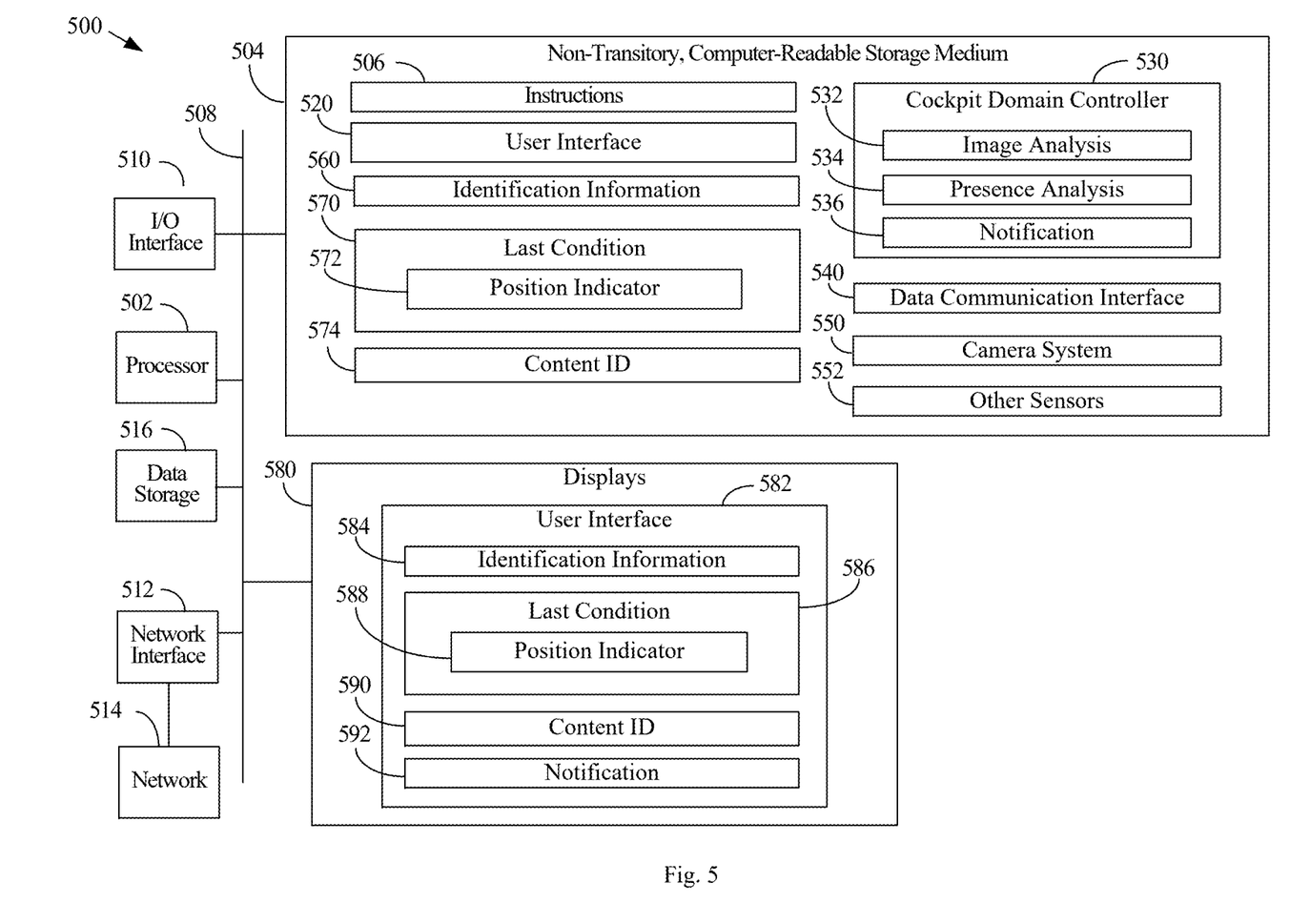
FIG. 5 is a high-level functional block diagram of a processor-based system according to at least one embodiment.

FIG. 5 is a high-level functional block diagram of a processor-based system 500 according to at least one embodiment.

In at least one embodiment, processing circuitry 500 manages content displayed in a vehicle. Processing circuitry 500 implements a method for managing content displayed in a vehicle using Processor 502. Processing circuitry 500 also includes a Non-Transitory, Computer-Readable Storage Medium 504 that is used to implement the method for managing content displayed in a vehicle. Non-Transitory, Computer-Readable Storage Medium 504, amongst other things, is encoded with, i.e., stores, Instructions 506, i.e., computer program code, that are executed by Processor 502 causes Processor 502 to perform operations for managing content displayed in a vehicle. Execution of Instructions 506 by Processor 502 represents (at least in part) an application which implements at least a portion of the methods described herein in accordance with one or more embodiments (hereinafter, the noted processes and/or methods).

Processor 502 is electrically coupled to Non-Transitory, Computer-Readable Storage Medium 504 via a Bus 508. Processor 502 is electrically coupled to an Input/Output (I/O) Interface 510 by Bus 508. A Network Interface 512 is also electrically connected to Processor 502 via Bus 508. Network Interface 512 is connected to a Network 514, so that Processor 502 and Non-Transitory, Computer-Readable Storage Medium 504 connect to external elements via Network 514.

Processor 502 is configured to execute Instructions 506 encoded in Non-Transitory, Computer-Readable Storage Medium 504 to cause processing circuitry 500 to be usable for performing at least a portion of the processes and/or methods. In one or more embodiments, Processor 502 is a Central Processing Unit (CPU), a multi-processor, a distributed processing system, an Application Specific Integrated Circuit (ASIC), and/or a suitable processing unit.

Processing circuitry 500 includes I/O Interface 510. I/O interface 510 is coupled to external circuitry. In one or more embodiments, I/O Interface 510 includes a keyboard, keypad, mouse, trackball, trackpad, touchscreen, and/or cursor direction keys for communicating information and commands to Processor 502.

Processing circuitry 500 also includes Network Interface 512 coupled to Processor 502. Network Interface 512 allows processing circuitry 500 to communicate with Network 514, to which one or more other computer systems are connected. Network Interface 512 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 500 is configured to receive information through I/O Interface 510. The information received through I/O Interface 510 includes one or more of instructions, data, design rules, libraries of cells, and/or other parameters for processing by Processor 502. The information is transferred to Processor 502 via Bus 508. Processing circuitry 500 is configured to receive information related to a User Interface (UI) through I/O Interface 510. The information is stored in Non-Transitory, Computer-Readable Storage Medium 504 as UI 520.

In one or more embodiments, one or more Non-Transitory, Computer-Readable Storage Medium 504 having stored thereon Instructions 506 (in compressed or uncompressed form) that may be used to program a computer, processor, or other electronic device) to perform processes or methods described herein. The one or more Non-Transitory, Computer-Readable Storage Medium 504 includes one or more of an electronic storage medium, a magnetic storage medium, an optical storage medium, a quantum storage medium, or the like.

For example, the Non-Transitory, Computer-Readable Storage Medium 504 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 504 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 504 stores Instructions 506 configured to cause Processor 502 to perform at least a portion of the processes and/or methods for managing content displayed in a vehicle. In one or more embodiments, Non-Transitory, Computer-Readable Storage Medium 504 also stores information, such as algorithm which facilitates performing at least a portion of the processes and/or methods for managing content displayed in a vehicle.

Accordingly, in at least one embodiment, Processor 502 executes Instructions 506 stored on the one or more Non-Transitory, Computer-Readable Storage Medium 504 to implement a method for managing content displayed in a vehicle. Processor 502 implements an Infotainment System that includes a Cockpit Domain Controller 530, which outputs contents, stores the last condition associated with content consumed by occupants, and manages data for recovering the last condition associated with the content. Processor 502 is configured to use Cockpit Domain Controller 530 to identify the last condition of the content being presented at the time the occupant exits the vehicle.

Processor 502 implements a Data Communication Interface 540 that is coupled to the Cockpit Domain Controller 530 to communicate with devices inside or outside the vehicle. For example, the Data Communication Interface 540 is able to use a wireless network. Processor uses Cockpit Domain Controller 530 to acquire Identification Information 560 to identify at least one occupant who is watching some content. Content is associated with an occupant through the Identification Information 560. The Identification Information 560 includes information identifying an occupant such as a facial image, device ID, and the like.

Camera System 550, including one or more cameras, is able to be coupled to the Cockpit Domain Controller 530 to detect an occupant. Processor 502 uses Image Analysis 532 of Cockpit Domain Controller 530 to perform facial recognition to identify occupants in each area of the vehicle based on images from Camera System 550. Image Analysis 532, e.g., machine learning, is able to be used to analyze images of occupants to determine Identification Information 560 for each occupant. Processor 502 also uses Other Sensors 552. For Example, Processor 502 uses Presence Analysis 534 of Cockpit Domain Controller 530 to process presence data from Other Sensors 552 to detect the presence of an occupant.

Processor 502 is also able to detect an occupant exiting the vehicle in response to a loss of Bluetooth or Wi-Fi connection, and the like, based on connections through Data Communication Interface 540. Upon detecting an occupant exiting the vehicle, Processor 502 determines a Last Condition 570 of the content associated with the Identification Information 560. Last Condition 570 includes a Position Indicator 572 of content being consumed by an occupant, e.g., a video, music, and the like, wherein the Position Indicator 572 is associated with the time the occupant exits the vehicle. The Last Condition 570 is indicated by the Position Indicator 572, e.g., a timestamp, a scroll position, a state function, and the like, along with a Content Identifier (Content ID 574) of the content itself. Using the content ID 574, Processor 502 determines a name of a video, a link to the content, a web address, a name of a game, a product code, and the like.

Processor 502 causes Cockpit Domain Controller 530 to store information, including the Content ID 574, Last Condition 570 as indicated, for example, by Position Indicator 572. However, according to at least one embodiment, information is able to be stored in Data Storage 516, or in the cloud, in a separate storage system, or any other storage configuration.

At a later time, Processor 502 detects the occupant returning to the vehicle using Cockpit Domain Controller 530. The Cockpit Domain Controller 530 identifies the occupant re-entering the vehicle according to the Identification Information 560, and then obtains the Content ID 574 associated with the re-entering occupant, and the Last Condition 570 for the content. Using the Last Condition 570, Processor 502 is able to cause Cockpit Domain Controller 530 to play the content from the point the occupant exited the vehicle or slightly before the Last Condition 570. The Last Condition 570 includes Position Indicator 572, which is able to be a time stamp associated with the content when the occupant exited the vehicle, an approximate last position, a calculated estimate of the Last Condition 570, and the like. For example, in response to Position Indicator 572 indicating the Last Condition 570 being a position at 10 minutes, Processor 502 is able to cause Cockpit Domain Controller 530 to start playback, for example, at 9 minutes and 50 seconds. Information about the Last Condition 570 of the content is able to be sent to the occupant, e.g., the information is sent to a user device such as a smartphone, a personal computer or laptop, a TV, and the like via Data Communication Interface 540.

Processor 502 is able to use one or more Displays 580 to present content and to present identification of each occupant using a User Interface 582, including Identification Information 584. Information about the Last Condition 570 of the content is able to be presented on one or more Displays 580. The information about the Last Condition 570 is able to be sent to the occupant via a Notification 536 sent to the occupant via at least one of a text message, an email, a push notification to an application, a voice mail message, and the like. User Interface 582 presents Notification 592 on one or more of Displays 580. The occupant is able to use User Interface 582 to retrieve the Last Condition 586 of the content in the vehicle.

Processor 502 is able to present information about the content and the Last Condition 586 including Position Indicator 588, as an option, on one or more Displays 580 in the vehicle, e.g., an infotainment system. Upon an occupant re-entering the vehicle, the Processor 502 causes the Cockpit Domain Controller 530 to access Data Storage 516 to determine possible existing entries associated with the re-entering occupant.

In some situations, the Cockpit Domain Controller 530 does not identify any entries associated with the occupant. In this situation, the Cockpit Domain Controller 530 is able to question the occupant for information via User Interface 582, such as a Content ID 590 and position. In another situation, Processor 502 causes the Cockpit Domain Controller 530 to identify more than one entry associated with the occupant. Again, the Cockpit Domain Controller 530 is able to communicate with the occupant through a device of the occupant or via the one or more Displays 580 to determine which entry the occupant wants to use.

Processor 502 is also able to cause Cockpit Domain Controller 530 to use a default setting that uses the latest entry. The Cockpit Domain Controller 530 is also able to delete older entries and save a current entry in response to an occupant existing the vehicle so that multiple entries are not used. In response to the user re-entering the vehicle, the entry is read from Data Storage 516 and then removed. The occupant re-entering the vehicle is thus able to resume consuming the content from the last position.

Embodiments described herein provide a method that provides one or more advantages. For example, a Cockpit Domain Controller is able to identify a time an occupant that is consuming content exits a vehicle and associate a point in the content (last condition) with the time the occupant exits the vehicle. Upon detecting that the occupant has re-entered the vehicle, the Cockpit Domain Controller is able to resume content from the point in the content (last condition) associated with the time the occupant exits the vehicle.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for managing content displayed in a vehicle, comprising:
   determining at least one occupant in a vehicle consuming content;
   acquiring identification information identifying the at least one occupant;
   detecting the at least one occupant exiting the vehicle;
   saving identification information identifying the at least one occupant, a content identifier (ID) of the content consumed by the at least one occupant, and a last position of the content at a time the at least one occupant exits the vehicle;
   detecting the at least one occupant re-entering the vehicle;
   retrieving the identification information identifying the at least one occupant, the content ID for the content, and the last position of the content associated with the identification information identifying the at least one occupant; and
   resuming the content identified by the content ID at the last position of the content for the at least one occupant associated with the identification identifier.

2. The method of claim 1, wherein the acquiring the identification information identifying the at least one occupant includes performing image analysis on a facial image captured by a camera to identify the at least one occupant.

3. The method of claim 1, wherein the acquiring the identification information identifying the at least one occupant includes acquiring a device identifier of a device of the at least one occupant.

4. The method of claim 1, wherein the retrieving the last position of the content associated with the identification information identifying the at least one occupant including retrieving a last condition associated with a position indicator for the last position of the content.

5. The method of claim 1, wherein the retrieving the identification information identifying the at least one occupant, the content ID for the content, and the last position of the content associated with the identification information identifying the at least one occupant includes sending a notification to the at least one occupant.

6. The method of claim 5, wherein the sending the notification includes sending at least one of a text message, an email, a push notification to an application, or a voice mail message to the at least one occupant.

7. The method of claim 1, wherein the acquiring the identification information identifying the at least one occupant includes retrieving the identification information associated with a registered user.

8. A apparatus for managing content displayed in a vehicle, comprising:
   a memory storing computer-readable instructions; and
   a processor connected to the memory, wherein the processor is configured to execute the computer-readable instructions to perform operations to:
   determine at least one occupant in a vehicle consuming content;
   acquire identification information identifying the at least one occupant;
   detect the at least one occupant exiting the vehicle;
   save identification information identifying the at least one occupant, a content identifier (ID) of the content consumed by the at least one occupant, and a last position of the content at a time the at least one occupant exits the vehicle;
   detect the at least one occupant re-entering the vehicle;
   retrieve the identification information identifying the at least one occupant, the content ID for the content, and the last position of the content associated with the identification information identifying the at least one occupant; and
   resume the content identified by the content ID at the last position of the content for the at least one occupant associated with the identification identifier.

9. The apparatus of claim 8, wherein the processor is further configured to acquire the identification information identifying the at least one occupant by performing image analysis on a facial image captured by a camera to identify the at least one occupant.

10. The apparatus of claim 8, wherein the processor is further configured to acquire the identification information identifying the at least one occupant by acquiring a device identifier of a device of the at least one occupant.

11. The apparatus of claim 8, wherein the processor is further configured to retrieve the last position of the content associated with the identification information identifying the at least one occupant by retrieving a last condition associated with a position indicator for the last position of the content.

12. The apparatus of claim 8, wherein the processor is further configured to send a notification to the at least one occupant regarding the identification information identifying the at least one occupant, the content ID for the content, and the last position of the content associated with the identification information.

13. The apparatus of claim 12, wherein the notification includes at least one of a text message, an email, a push notification to an application, or a voice mail message to the at least one occupant.

14. The apparatus of claim 8, wherein the processor is further configured to acquire the identification information identifying the at least one occupant by retrieving the identification information associated with a registered user.

15. A non-transitory computer-readable media having computer-readable instructions stored thereon, which when executed by a processor causes the processor to perform operations comprising:
   determining at least one occupant in a vehicle consuming content;
   acquiring identification information identifying the at least one occupant;
   detecting the at least one occupant exiting the vehicle;
   saving identification information identifying the at least one occupant, a content identifier (ID) of the content consumed by the at least one occupant, and a last position of the content at a time the at least one occupant exits the vehicle;
   detecting the at least one occupant re-entering the vehicle;
   retrieving the identification information identifying the at least one occupant, the content ID for the content, and the last position of the content associated with the identification information identifying the at least one occupant; and
   resuming the content identified by the content ID at the last position of the content for the at least one occupant associated with the identification identifier.

16. The non-transitory computer-readable media of claim 15, wherein the acquiring the identification information identifying the at least one occupant includes performing image analysis on a facial image captured by a camera to identify the at least one occupant.

17. The non-transitory computer-readable media of claim 15, wherein the acquiring the identification information identifying the at least one occupant includes acquiring a device identifier of a device of the at least one occupant.

18. The non-transitory computer-readable media of claim 15, wherein the retrieving the last position of the content associated with the identification information identifying the at least one occupant including retrieving a last condition associated with a position indicator for the last position of the content.

19. The non-transitory computer-readable media of claim 15, wherein the retrieving the identification information identifying the at least one occupant, the content ID for the content, and the last position of the content associated with the identification information identifying the at least one occupant includes sending a notification to the at least one occupant, and wherein the sending the notification includes sending at least one of a text message, an email, a push notification to an application, or a voice mail message to the at least one occupant.

20. The non-transitory computer-readable media of claim 15, wherein the acquiring the identification information identifying the at least one occupant includes retrieving the identification information associated with a registered user.

\* \* \* \* \*